April 14, 1925.
L. C. CRESCIO
MULTIPLE STANDARD MICROMETER
Filed Sept. 14, 1921
1,533,787
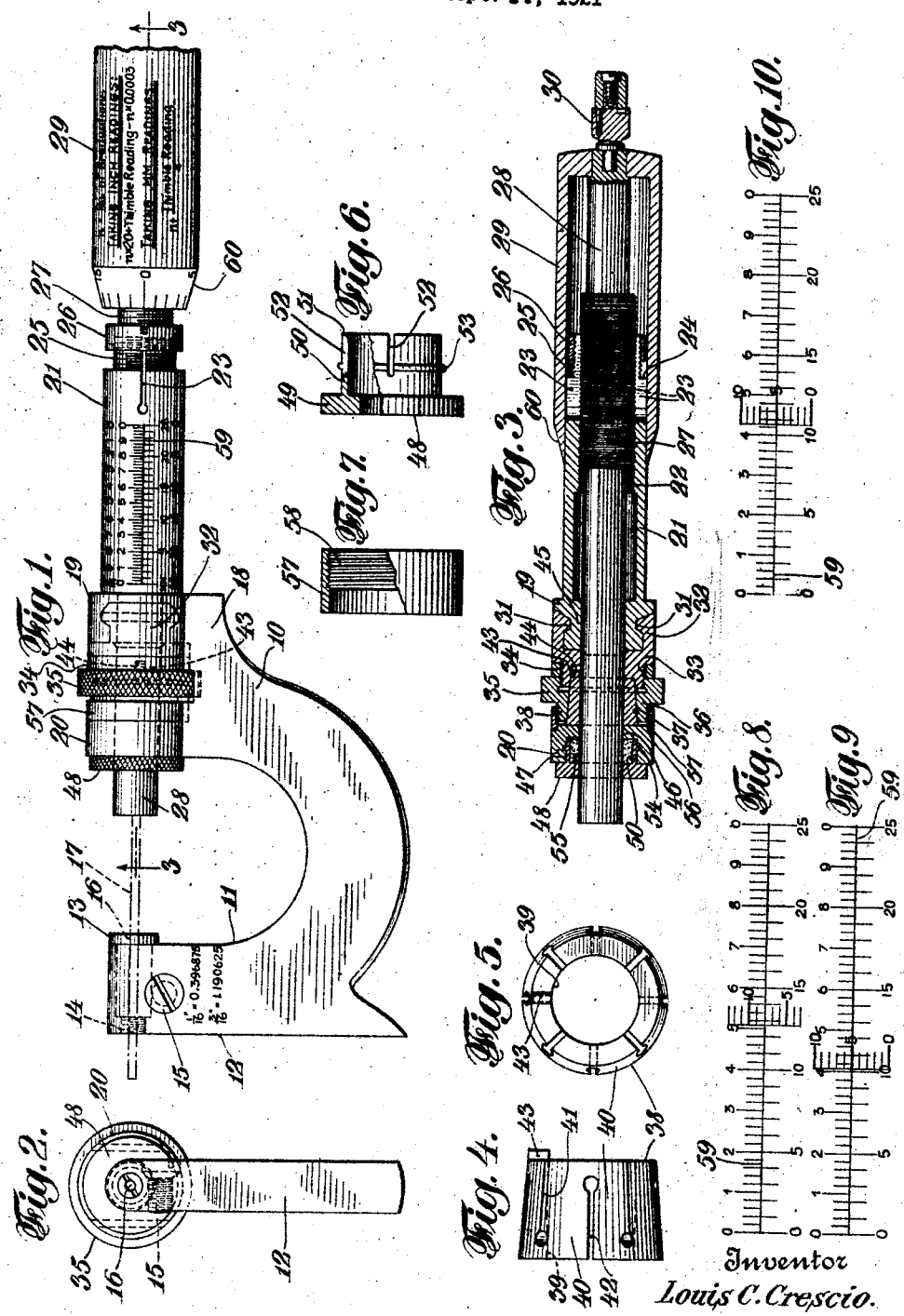
Inventor
Louis C. Crescio.
By his Attorney Patented Apr. 14, 1925.

1,533,787

UNITED STATES PATENT OFFICE.

LOUIS C. CRESCIO, OF NEW YORK, N. Y., ASSIGNOR OF ONE-HALF TO LOUIS MALATESTA, OF NEW YORK, N. Y.

MULTIPLE-STANDARD MICROMETER.

Application filed September 14, 1921. Serial No. 500,676.

*To all whom it may concern:*

Be it known that I, LOUIS C. CRESCIO, a citizen of the United States, and resident of 7 Sixth Avenue, New York city, in the county of New York and State of New York, have invented certain new and useful Improvements in Multiple-Standard Micrometers, of which the following is a specification.

This invention relates to micrometers in general, and particularly to the kind adapted for taking simultaneous readings in various standards.

In order to understand the principle of my invention, a general explanation of the working of a micrometer is necessary. Micrometers made today are usually made to read in one standard, for instance, inches or millimeters, and to this end the pitch of the screw thread of the micrometer spindle is, in inch micrometers 40 to an inch, while in millimeter micrometers, the pitch is one millimeter. Consequently the graduation for inches corresponds with the pitch of the screw, that means that there are 40 divisions to an inch. Thus, through one complete revolution of the spindle, the latter moves longitudinally 1/40 or .025 of an inch.

The graduation on the thimble of an inch micrometer is divided into 25 parts circumferentially, and by rotating the thimble from one of its marks to the next, the spindle moves longitudinally 1/25 of .025″, in other words, .001 of an inch. When it rotates to the second division, the spindle moves .002 of an inch etc. Thus when the thimble rotates a complete revolution of 360 degrees, the spindle has moved .025 or 1/40 of an inch.

In order to take the readings in an ordinary inch micrometer, the longitudinal graduation of the barrel or sleeve not covered by the thimble of the micrometer is multiplied by 25, and added to the product is the reading taken from the thimble graduation.

In millimeter micrometers as used today, the graduation of the thimble is either in hundredths or other decimals of a millimeter, thus the readings are taken direct— that means—to the number of millimeters not covered by the thimble of the micrometer is added the reading from the thimble which represents decimals of a millimeter.

The present invention represents a combination of inch and millimeter graduations upon the sleeve or barrel with a single graduation upon the thimble, co-operating with the longitudinal graduations.

In order to obtain the proper results, I have provided instead of a millimeter pitch or a .025 inch pitch for the screw thread of the spindle, an exact 1/2 millimeter pitch; that means I have divided an inch into 50 parts less a fraction of .4 of a millimeter. Thus the 50 graduations do not represent really one full inch, and the inch readings would be inaccurate if I would not provide a compensating co-efficient, which is used in computing inch readings.

The correct division of an inch into 50 parts expressed in millimeter equivalent would be .508 millimeter. Now the 1/50 part of an inch represents .020 thereof.

My actual division, however, is not a true division of an inch into 50 equal subdivisions, since these subdivisions are but .5 mm. and not .508 mm. The difference of .008 mm. which is equal to .00031496, or roughly .000315 inch, represents my correcting factor or co-efficient, which is to be subtracted from each reading on the inch graduation for each single subdivision.

For example, if the thimble of a micrometer would leave visible 25 inch graduations of the longitudinal scale on the barrel, the readings, irrespective of the thimble readings, would be 25 times .020, giving .5 of an inch, which reading would be correct if each 50 divisions would be .508 of a millimeter. Since, however, the division is .5 of a millimeter, the actual inch readings, are shorter 25 times .008 of a millimeter, or 25 times .000315 of an inch. Therefore from the reading of .5 of an inch, the product of 25 times .000315, which is .007875, is to be deducted. The final reading therefore, correct up to the thousandths, will be .492125 of an inch.

The thimble graduation is divided into 20 equal parts and the readings from the thimble are directly added to the readings taken from the longitudinal scale. In computing the readings to the correct figure, the longitudinal readings are again multiplied by .020, added thereto is the reading from the thimble, and subtracted from this sum is the product of the number of visible graduations times the compensating factor .000315. Thus, for instance, when the thimble graduation 8 co-incides with the indicator line of the longitudinal scale after having passed the mark 5 of the inch graduation, the reading is computed as follows:—25 times .020 gives .5 of an inch. Added thereto is the thimble reading .008, which gives the sum of .508 and subtracted from this sum is the product of 25 times .000315, which is .007875, giving the correct reading of .500 of an inch.

Corresponding with this inch reading, the millimeter reading is 12.7 which means that this millimeter reading is equal to 1/2 inch. The millimeter readings are taken as follows:—The thimble being divided into 20 equal parts, it is necessary, in order to obtain thousandths of a millimeter, to divide the thimble readings by 40, giving the proper 1/1000 millimeter reading.

Due to the pitch of the spindle screw, the spindle, and thus the thimble has to make two complete revolutions of 360 degrees before the spindle moves a complete millimeter in longitudinal direction. When, therefore, millimeter readings are taken before the thimble has reached the first half of a millimeter, the procedure is as follows:—For example, the thimble uncovers 10 millimeter graduations and the first half of the 11th millimeter graduation. Assuming that the thimble graduation 5 appears to coincide with the indicator line of the longitudinal scale, the readings will be 10 millimeters, plus the result of 5 divided by 40, which is .125. The complete reading therefore will be 10.125 mm.

In taking measurements when the thimble has passed the second half of the millimeter graduation, .5 is added to the thimble reading, thus when, for instance, the thimble has passed the one-half millimeter mark (which is equivalent to the inch division of the sleeve graduation) and the 5th thimble graduation appears to coincide with the longitudinal indicator line, the readings will be 10 millimeters, plus .5 millimeter, plus the result of the division 5 through 40, which is .125. The complete reading therefore will be 10.625.

From the above explanation, it will be seen that the inch readings, accurate to thousandths of an inch, and millimeter readings accurate to .025 of a millimeter, may be taken by my instrument simultaneously.

One of the objects of my invention is a micrometer provided with means for simultaneously taking readings in a plurality of standards.

Another object of my invention is to provide a unitary multiple graduated scale of various standards for taking simultaneous readings in such standards.

A further object of my invention is to provide in such micrometer, means for facilitating locking my device, in any desired position during the period of taking readings and without in any way impairing the alinement of the micrometer spindle.

A further object of my invention is to provide within such locking means, a friction member adapted to uniformly, and at all points of its contacting surface, exert a radially inward pressure against the spindle without in any way affecting the alinement of the latter.

A further object of my invention is to provide dust proofing means for preventing foreign matter from entering the spindle bearings and the said locking means.

The foregoing and further objects will be more fully apparent from the following description and the accompanying drawing, forming a part of this specification, and in which:—

Fig. 1 represents a side elevation of one preferred form of a micrometer equipped with my graduations.

Fig. 2 is an end elevation of my invention.

Fig. 3 is a cross sectional view taken on line 3—3 of Fig. 1.

Fig. 4 is a detail view of my locking or friction member.

Fig. 5 is an end view thereof.

Fig. 6 is a detail view of the closing cap of my dust proofing arrangement.

Fig. 7 is the ring member of my dust proofing arrangement.

Figs. 8, 9, and 10 are diagrams illustrating the methods of taking readings mentioned above.

Referring to the drawings, numeral 10 denotes the frame of my device, upon which faces are provided conversion tables, for converting fractions of inches into millimeters.

The frame as shown in Fig. 1 has an anvil arm 11 provided with a flat surface, indicated at 12, adapted for taking depth measurements, as will be explained later.

The anvil 13 is provided with a threaded extension 14 for adjustment of the anvil in longitudinal direction. Its position is thus fixed by a clamping screw 15. The anvil is drilled longitudinally as indicated at 16 to receive a steel rod 17, which abuts with the spindle of the micrometer.

The other leg of the frame is enlarged at 18 and possesses two spindle bearing extensions 19 and 20 respectively. Extending from bearing extension 19 is a barrel or sleeve 21, provided with an internal thread 22 of a half millimeters pitch. The sleeve is split at 23 and reduced at 24, the reduced portion of which is externally threaded at 25 to receive an adjusting screw 26 for taking care of the wear in internal thread 22.

Engaging thread 22 is a threaded portion 27 of spindle 28 the free end of which is associated with a thimble 29 terminating in a ratchet arrangement indicated at 30. The latter serves for assuring the operator, when taking measurements to exert at all times the same degree of pressure upon the object to be measured.

The enlarged end of sleeve 21 is cut out as to coincide and interlock with the corresponding shapes 31 of member 32.

The intermediate member 32 is reduced and threaded at 33 and provided with a resilient washer 34, covering the free threads. Engaging these threads at the extreme end of the reduced portion of intermediate member 32 is the knurled annular enlargement 35 of closing member 36 provided with a tapered inner aperture 37, adapted to engage the beveled outer surface of friction member 38, as shown in detail in Figs. 4 and 5.

This friction member possesses an annular opening 39 and is split into a plurality of uniform sections 40 by incisions 41 and 42, alternately open at the opposite ends of the friction member, as clearly seen in Fig. 4. Extending from its reduced end is a lug 43, engaging a recess 44 provided in the intermediate member 32.

By means of this lug held in the recess, the friction member is prevented from turning when the closing or clamping member 36 is revolved and moves upon the conical outer surface of the friction member in the direction toward or from bearing extension 20.

The spindle 28 is lodged within bearing 45 of bearing extension 19, and bearing 46 in bearing extension 20. Adjacent to the latter bearing, an annular recess 47 is provided in bearing extension 20 for receiving a closing member or cap 48, shown in detail in Fig. 6.

This cap consists of a ring shaped portion 49, and extending therefrom is a cylindrical portion 50 tapered toward its edge at 51 and divided by a plurality of slots 52 into sections.

At the outer surface of the cylindrical extension 50 is a bead 53, adapted to engage a groove 54, provided in the annular recess 47 of bearing extension 20.

The space enclosed by the cylindrical portion 50 of the cap, the cylindrical surface of spindle 28, the bearing 26 and the ring portion 49 of the cap is filled with packing material 55, which is compressed by inserting the cap into recess 47. In order to prevent dust from entering the space between closing member 36 and bearing extension 20, the latter is recessed at 56 for providing a seat for ring 57 extending over the reduced portion of closing member 36.

The extending portion of the ring is internally threaded or corrugated, as indicated at 58. Any dust or foreign matter entering the first of the grooves in the ring will fill the latter and prevent other foreign matter from reaching the space between bearing extension 20 and closing member 36.

The caliper as shown in the drawing may be used for both depth measurements and ordinary surface measurements, for which reason the graduations upon the barrel or sleeve may be read in either right or left hand direction.

The scale of multiple graduations has a single indicator line 59 co-operating with the thimble graduation provided on the beveled portion 60 of the thimble.

In order to facilitate taking readings in both inch and millimeter standards, on the surface of the thimble successive steps in the manner of taking readings may be imprinted, together with the compensation factor.

The operation of the locking or clamping device is the subject matter of another application.

While I have shown a specific design of my invention, be it understood that the principle of graduation may be adapted to any micrometer design. In order to facilitate taking still more accurate readings, the application of the familiar Vernier scale may be employed to operate in conjunction with the thimble scale.

I therefore reserve for myself the right to apply my principle to any existing or newly designed micrometer, and to make such improvements as are deemed necessary for various employments of my instrument.

Having thus described my invention, I claim:—

In a micrometer, for taking simultaneously readings in various standards, said micrometer composed of a spindle provided with a thread of a pitch equal to one half millimeter, a sleeve having a corresponding thread engaging the spindle, a double graduated longitudinal scale provided upon said sleeve and having a common indicator line, one graduation being in millimeters, the other in substantially one fiftieth parts of an inch, a thimble associated with said spindle and telescoping with said sleeve, and having a circumferential graduation of twenty lines, adapted to co-operate with said scale and said indicator line in taking millimeter and inch readings at one setting of said thimble.

Signed at New York in the county of New York and State of New York this 31st day of August A. D. 1921.

LOUIS C. CRESCIO.